United States Patent [19]

Hammarstrom et al.

[11] Patent Number: 5,611,827
[45] Date of Patent: Mar. 18, 1997

[54] METHOD FOR PREPARING MIXTURES FOR ABRASIVE ARTICLES

[75] Inventors: Janet L. Hammarstrom, Auburn; Michael J. Lemberger, Worcester; Mark W. Rowden, Leicester, all of Mass.; Arno Gardziella, Rüdinghauser Berg, Germany

[73] Assignee: Norton Company, Worcester, Mass.

[21] Appl. No.: 689,575

[22] Filed: Aug. 12, 1996

Related U.S. Application Data

[63] Continuation of Ser. No. 333,178, Nov. 2, 1994, abandoned.

[51] Int. Cl.$^6$ ............................................. B24D 3/28
[52] U.S. Cl. ........................................ 51/298; 51/295
[58] Field of Search ........................... 51/293, 295, 298; 427/242

[56] References Cited

U.S. PATENT DOCUMENTS

| | | | |
|---|---|---|---|
| 3,619,151 | 11/1971 | Sheet, Jr. et al. | 51/307 |
| 3,878,160 | 4/1975 | Grazen et al. | 260/38 |
| 4,099,934 | 7/1978 | Suzuki et al. | 51/295 |
| 4,101,500 | 7/1978 | Brodsky | 260/38 |
| 4,264,557 | 4/1981 | Annis | 264/328.1 |
| 4,918,116 | 4/1990 | Gardziella et al. | 523/149 |
| 5,131,923 | 7/1992 | Markhoff-Matheny | 51/293 |
| 5,135,892 | 8/1992 | Ellison-Hayashi | 501/1 |
| 5,399,606 | 3/1995 | König et al. | 524/385 |

FOREIGN PATENT DOCUMENTS

| | | | |
|---|---|---|---|
| 54077390 | 6/1979 | Japan | B24D 3/28 |
| 62-246474 | 10/1987 | Japan | B24D 3/28 |
| 1789148 | 2/1993 | Russian Federation | B24D 3/24 |
| 935260 | 10/1982 | U.S.S.R. | B24D 3/28 |
| 1423363 | 9/1988 | U.S.S.R. | B24D 18/00 |
| 1611719 | 12/1990 | U.S.S.R. | B24D 3/28 |

OTHER PUBLICATIONS

J.F. Monk; Thermosetting Plastics, Chapter 3; "Compression Moulding of Thermosetting Materials"; pp. 41/71 (no date).

Kirk–Othmer Encyclopedia of Chemical Technology, Third Edition, vol. 17; "Phenolic Resins"; pp. 384/416 (no date).

Bakelite$^R$ publication; "Rutaphen$^R$–Resins for Grinding Wheels–Technical Information" (KN 50E–09.92–G&S–BA) (no date).

Bakelite$^R$ publication: "Rutaphen$^R$ Phenolic Resins—Guide/Product Ranges/Application" (KN107/e–10.89 GS–BG) pp. 80/81 (no date).

*Primary Examiner*—Deborah Jones
*Attorney, Agent, or Firm*—Mary E. Porter

[57] ABSTRACT

An improved method for preparing a molding material for abrasive articles has been developed. The method includes the step of continuously blending an abrasive material with a curing agent and measured portions of two phenol-novolac resins, one of which has a phenol-formaldehyde molar ratio in the range of about 1:0.2 to 1:0.35. The blending composition can also include various other materials, such as fillers. The resulting product is a flowable, granular material homogeneously coated with the phenol-novolac resins. The product can be directly molded, i.e., without an aging step, into various abrasive articles, such as grinding wheels.

In another embodiment, either a continuous or discontinuous technique can be used to blend the phenol-novolac resins, and the molded product is then cold pressed or warm pressed at a pressing temperature less than about 140° C.

33 Claims, No Drawings

METHOD FOR PREPARING MIXTURES FOR ABRASIVE ARTICLES

This is a continuation of U.S. Ser. No. 08/333,178, filed Nov. 2, 1994, now abandoned.

TECHNICAL FIELD

This invention generally relates to bonded abrasive articles. More specifically, it relates to methods for manufacturing the articles, including the preparation of precursor mixtures.

BACKGROUND OF THE INVENTION

Resin-bonded abrasive articles such as grinding wheels are typically produced by blending discrete abrasive particles with a liquid binder material and a powdered resin, and then pressing the mixture under appropriate thermal conditions. Other constituents can be included in the mixtures, e.g., fillers, curing agents, wetting agents, and various metal powders. An aging period which allows for solvation of the dry portion of the mixture with the liquid resin is usually required before pressing.

As noted in U.S. Pat. No. 4,918,116 (Gardziella et al), novolac resins have often been used as solutions in solvent-based systems for abrasive articles. A disadvantage of such a system is the easy ignitability of the solvents at high temperatures. While solvent-free modified novolacs have been developed, these materials are quite expensive, and their commercial use may often not be economical.

In addition to the difficulties involved with using certain novolac binders for making abrasive articles, manufacturers are sometimes faced with other production problems as well. For example, as pointed out in Gardziella, the use of liquid gain wetting agents such as furfural when preparing molding materials for abrasive discs may result in an unstable molding mixture. Furthermore, the use of such a mixture may generate a large amount of dust—often a drawback on the manufacturing floor.

The dust and stability problems associated with using novolac binders appears to have been somewhat alleviated by the teachings set forth in Gardziella. This reference discloses the preparation of various molding materials, using specific phenol-novolacs having a phenol-formaldehyde molar ratio of 1:0.2 to 1:0.35. As an example, abrasive discs are prepared by using heated corundum grains wetted with a hot melt of the specified phenol-novolacs. After being blended at 140° C. in a high-power mixer, the composition is cooled to 90° C. and then further blended with a second novolac resin and a curing agent.

The type of novolac resins discussed in Gardziella are often used in a multi-step process for preparing a precursor molding material for abrasive articles. This process involves applying a heated, liquid novolac resin to abrasive particles by a mixing technique, followed by the application of a dry bonding material. The dry material usually includes another novolac resin, fillers, and one or more curing agents. The sequence of applying liquid resin and dry binding material is repeated in two or more discrete steps to eventually obtain dry, flowable, homogeneously-coated abrasive grains.

From this brief discussion, it should be apparent that there are advantages and disadvantages involved in using various novolac resins to prepare articles like abrasive discs. A process which does not require high-power mixers and temperatures as high as 140° C. would be commercially attractive. Additional economic benefits would result from a process which does not require multiple applications of liquid binder and dry binder, and which does not call for the heating and cooling cycles described in Gardziella. Moreover, elimination of the time-consuming aging step before pressing would be another major improvement.

Ideally, these process improvements would not occur at the expense of material properties. For example, the attainment of flowable, homogeneously-coated abrasive grains (which are also substantially dust-free) as a molding material for discs would still be an important objective in a manufacturing setting.

Finally, the characteristics of the final article should remain very attractive. In the case of an abrasive wheel, the desirable properties include grindability and long working life.

SUMMARY OF THE INVENTION

In view of the needs described above, an improved method for preparing a molding material for abrasive articles has been developed. In one embodiment of this invention, "embodiment A", the method comprises the step of continuously blending an abrasive material with measured portions of (i) a low-molecular weight phenol-novolac resin having a phenol-formaldehyde molar ratio in the range of about 1:0.2 to about 1:0.35, heated to a temperature sufficient to yield a viscosity in the range of about 300 cp to about 3000 cp;

(ii) a composition comprising a second phenol-novolac resin; and (iii) a curing agent.

Blending is carried out at a temperature in the range of about 80° C. to about 130° C. The resulting product, if cooled to ambient temperature, would be a dry, flowable granular material homogeneously coated with the phenol-novolac resins. The product does not have to be cooled and stored immediately, though, because it can be directly molded, i.e., without an aging step, in an additional embodiment of the invention. Molding ("pressing") can be carded out at a temperature below that used in hot pressing, e.g., below about 140° C.

In another embodiment of this invention, "embodiment B", the abrasive material may be blended with the two phenol-novolac resins by either a continuous or discontinuous technique, and the molded product is then cold pressed or warm pressed at a pressing temperature less than about 140° C.

Abrasive articles prepared by either of these embodiments, such as wheels, have good grinding characteristics. Further details regarding all aspects of this invention will follow.

DETAILED DESCRIPTION OF THE INVENTION

The continuous blending of the abrasive material with components (i) and (ii) is an important aspect of embodiment A of the present invention. As used in regard to the initial steps of an overall process for preparing abrasive articles, "continuous blending" means applying the material of each component to the abrasive grains without substantial interruption. As an example, components (i) and (ii) are preferably delivered to the mixer simultaneously. This technique is to be contrasted with methods used in the past, which involved batch mixing, i.e., blending a portion of component (i) with a portion of component (ii), followed by an additional portion of (i) and an additional portion of (ii), and so forth. The curing agent of this invention, component (iii), can be delivered to the mixer at any appropriate time, before or during addition of the other ingredients, but is preferably preblended with component (ii). Additional details regarding the blending technique will be supplied below.

The abrasive material used for this invention may be either a conventional material or a superabrasive. Conventional abrasives are well-known in the art, and include, for example, aluminum oxide, silicon carbide, zirconia-alumina, garnet, emery, and flint. Superabrasives are also known in the art. Examples are diamond, cubic boron nitride (CBN), and boron suboxide (described in U.S. Pat. No. 5,135,892 and herein incorporated by reference). Various mixtures of abrasive materials are also contemplated, e.g., a mixture of aluminum oxide and zirconia alumina. The total amount of abrasive material employed in the process described below is an amount which will constitute about 40 to about 70 volume % of any abrasive body prepared by this process.

The average particle size of grains (sometimes relented to as "grits") of the abrasive material depends on a variety of factors, such as the particular abrasive utilized, as well as the end use of tools formed from the abrasive body. In general, an average particle size for superabrasives and conventional abrasives is in the range of about 0.5 to about 5000 micrometers, and preferably, in the range of about 2 to 200 micrometers. Those of ordinary skill in the art will be able to select the most appropriate abrasive particle size for a desired application without undue experimentation.

In some embodiments, this invention can include a sol-gel-derived abrasive. Primary examples of these are the sol-gel alumina abrasive grits, which can be seeded or unseeded. These types of materials are described, for example, in U.S. Pat. No. 5,131,923, incorporated herein by reference.

The abrasive material may be used at room temperature. However, it is preferably preheated before blending begins, e.g., to a temperature in the range of about 30° C. to about 150° C. In especially preferred embodiments, the temperature difference is within about 25° C. of that of the phenol-novolac which will be blended in as component (i), as described below. This matching of material temperature will minimize viscosity increases which would occur when heated resinous material contacts colder abrasive particles.

The phenol-novolac resin of component (i) is described in the above-mentioned U.S. Pat. No. 4,918,116 (Gardziella), incorporated herein by reference. As described in Gardziella, this type of resin has a phenol-formaldehyde molar ratio in the range of 1:0.2 to 1:0.35. The resins used herein can be produced very economically, and usually have a content of free phenol of less than about 0.5%. These resins also have a very high adhesive holding power, giving them very good processing properties. In the case of abrasive discs, for example, the use of these resins results in very free-flowing granules for the molding material. An additional attribute of the granules is their stability, which guarantees long storage life.

The phenol novolacs of component (i) are usually prepared by condensation, as described in Gardziella. The preferred molecular weight of these materials for the purpose of the present invention is in the range of about 200 to about 1000, weight average.

The phenol-novolacs of component (i) are solid at room temperature, and begin to melt above 25° C. At 70° C., they have a relatively low melting viscosity, making them easy to handle and blend with the other components. (Furthermore, the low melting viscosity obviates the need for solvents during the blending step). They are preferably preheated to a temperature sufficient to yield a viscosity in the range of about 300 cp to about 3000 cp before being delivered to the mixer. The preferred viscosity lies in the range of about 400 cp to about 800 cp, which corresponds to a temperature of about 125° C. to about 115° C.

As mentioned above, component (ii) comprises a second phenol-novolac resin. The nature of this resin is not critical, although its phenol-novolac ratio preferably lies outside of the ratio of the resin of component (i). It can, for example, be one of the materials generally described in the *Kirk-Othmer Encyclopedia* of Chemical Technology, Third Edition, Volume 17, pages 384 to 416, the contents of which are incorporated herein by reference. Suitable phenol novolacs are also described in U.S. Pat. Nos. 4,264,557 (Annis) and 3,878,160 (Grazen et al), both incorporated herein by reference.

In this invention, the component (ii) phenol-novolac will typically have a phenol-formaldehyde molar ratio in the range of about 1:0.5 to about 1:0.9. Like component (i), these materials are also solid at room temperature, and begin to melt above about 70° C. However, these materials are delivered to the mixer as solids, i.e., below their melting point. Preferably, they are used at room temperature, in the form of a powdery mix with some of the optional constituents described below. (For this reason, component (ii) is often referred to as the "dry bonding" component in the process).

The preferred molecular weight of the component (ii) phenol-novolac is in the range of about 2,000 to about 15,000. An especially preferred molecular weight range is usually about 5,000 to about 12,000.

In regard to the relative amounts of phenol-novolac resins used hereto, the weight ratio of component (i) to component (ii), excluding other ingredients, is usually in the range of about 7:1 to about 1:7. An especially preferred ratio for most embodiments of this invention lies in the range of about 3:1 to about 1:3.

Component (ii) of this invention can also include all or a portion of the curing agent designated as component (iii). In such an instance, the curing agent usually constitutes about 0.1% to 20% by weight, and preferably about 7% to 14% by weight, of the total weight of phenol-novolac resins to be included in the molding material. A guideline regarding the total amount of curing agent for the molding material is provided below, along with a description of suitable agents.

A wide variety of fillers can also be included in component (ii). Nonlimiting examples of suitable fillers are sand, silicon carbide, alumina, bauxite, chromites, magnesite, dolomites, mullite, borides, fumed silica, sol gel materials, titanium dioxide, carbon products (e.g., carbon black, coke, or graphite); corundum, wood flour, clay, talc, hexagonal boron nitride, molybdenum disulfide, zirconia, and various forms of glass, such as glass fiber. Mixtures of more than one filler are also possible.

The effective amount for each filler or combination of fillers can be determined by those of ordinary skill in the art. The usual level of fillers for this invention is about 0.1 to about 30 parts by weight, based on the weight of the entire composition. In the case of abrasive discs, the level of filler material is usually in the range of about 5 to 20 parts by weight, based on the weight of the disc.

Component (ii) of this invention may also include other ingredients typically employed in making abrasive articles.

Notable examples include antistatic agents; metal oxides such as lime, zinc oxide, magnesium oxide, and mixtures thereof; and lubricants such as stearic acid and glycerol monostearate. As in the case of fillers, the appropriate amount of each of these materials can readily be determined by those skilled in the art.

Component (iii) comprises an effective amount of at least one curing agent. These materials are well-known in the art. They are described, for example, in the above-mentioned patent of Grazen et al. Various amines may be used, such as ethylene diamine; ethylene triamine; methyl amines; and hexamethylene tetramine ("hexa"). Precursors of such materials may also be used. As an example, ammonium hydroxide is a suitable curing agent because it reacts with formaldehyde to form hexa. Hexa and its precursors are the preferred curing agents.

Effective amounts of the curing agent can be determined without undue experimentation. Usually, about 5 to about 20 parts (by weight) of curing agent are employed per 100 parts of total phenol-formaldehyde resin. Those of ordinary skill in the area of resin-bound abrasive articles will be able to adjust this level, based on various factors, e.g., the particular types of resins used; the degree of cure needed, and the desired final properties for the articles: strength, hardness, and grinding performance. In the preparation of abrasive wheels, an especially preferred level of curing agent lies in the range of about 8 parts to about 15 parts by weight. As described above, it is often desirable to preblend all or a portion of the curing agent with component (ii).

Various mixers may be used to blend the abrasive material with the other components described above. Examples of suitable mixers are the Eirich (e.g., model RV02) and Littleford types, as well as a bowl-type mixer. The best results in terms of abrasive gain quality are usually achieved by using a low power mixer. Low power also prevents excessive part wear, as compared to wear characteristics when a higher power mixer is employed.

As an illustration of low power operation, the Eirich model mentioned above should be used at a slow pan speed, usually less than about 65 rpm, with a mixing agitator speed of less than about 2,000 rpm.

Bowl-type mixers are preferred. For this invention, these types of mixers are also operated at relatively low power, e.g., a pan speed of less than about 50 rpm. The bowl-type mixers often include one or more sets of paddles, which for this invention preferably operate at a speed of less than about 200 rpm. In the most preferred embodiments, the paddles operate at a speed of less than about 150 rpm.

As mentioned above, the continuous blending of abrasive (already situated in the mixer, and usually preheated) with components (i) and (ii) in this invention usually requires the simultaneous delivery of each component. Simultaneous addition readily permits the abrasive gains to become homogeneously coated with each component, as described below. The relative amount of each component being delivered to the mixer is measured so that the proportion of each component to the other during delivery is as constant as possible.

Blending times depend on a variety of factors related to processing and materials, e.g., the type of abrasive and binder resins employed, the presence or absence of fillers; the type and capacity of mixer equipment used; the quantities of materials being processed, etc. In general, blending time will range from about 3 minutes to about 6 minutes for a smaller scale of processing, e.g., 50 pounds total material; and from about 3 minutes to about 8 minutes for a larger-scale situation, e.g., up to about 600 pounds total material. Those of ordinary skill in abrasives processing will be able to select the most appropriate blending time, based in part on the teachings herein.

As mentioned above, the blending temperature during and after addition of the various components is usually in the range of about 80° C. to about 130° C. Preferably, the blending temperature is in the range of about 90° C. to about 125° C. The temperature tends to decrease during the blending process for several reasons. First, the blending system is usually open to the atmosphere, with a consequent loss of heat. Second, the dry bonding material of component (ii) is usually delivered to the mixer at room temperature. Thus, the final temperature of the mixture after blending is complete is usually in the range of about 65° C. to 90° C. The temperature drop is beneficial in some respects, since it tends to inhibit premature cure and agglomeration of the abrasive/resin system.

It should be noted that the process described herein does not call for the direct, intentional cooling of the blend from a relatively high temperature to a much lower temperature. This is to be contrasted with the teachings of the above-mentioned Gardziella patent for preparing abrasive discs. In example 10, Gardziella describes blending a phenol-novolac resin like component (i) at 140° C., and then cooling the blend to 90° C. Since the present invention does not require the very high preliminary blending temperature of Gardziella, the direct cooling step specified therein is unnecessary and sometimes disadvantageous from a commercial point of view.

After blending is complete, the molding material can be stored for later use. It is a dry, flowable granular material upon cooling to ambient temperature. Furthermore, the granules are substantially dust-free, as opposed to molding materials prepared with a higher level of volatile ingredients.

After completion of the above-described process, the abrasive gains in the present invention are homogeneously coated with the phenol-novolac resins of components (i) and (ii). This homogeneity is demonstrated by examination of the grains. The absence of significant regions where the dry bond (i.e., fillers and resin associated with component (ii)) is excessively concentrated is apparent. Similarly, the absence of significant tacky, "resin-rich" regions is noted, i.e., areas with excessive concentrations of the component (i) phenol-novolac.

Homogeneity is further demonstrated by a reduced amount of "loose material", i.e., material which does not adhere to the abrasive grains. Loose material can cause significant processing complications, and minimizing its presence is important. The total amount of component (i) and (ii) which does not adhere to the abrasive grains after the blending step should be less than about 3% by weight, based on the total weight of the molding material. In preferred embodiments, the amount is less than about 1.5%. In especially preferred embodiments, e.g., where the molding material is to be used for the preparation of high performance abrasive discs, the amount of this non-adherent material should be less than about 0.5%.

Another important attribute of a molding material prepared by the present process is its storage stability. Unlike prior art compositions which contained a higher level of volatile constituents, these molding materials generally do not undergo physical or chemical change due to evaporation over a period of time. As an example, a 600 pound sample can be stored at room temperature for at least 3 months, and then pressed and cured to form an abrasive article which has the same characteristics as an article prepared with a "freshly-blended" molding material.

Instead of being stored, the molding material can be used immediately to prepare the abrasive articles of interest. It is usually first passed through a screen to remove any agglomerates, and then conveyed directly to molding equipment. Thus, in preferred embodiments, there is no aging step between blending and molding, unlike most of the processes of the prior art. Since an aging step can be costly and time-consuming, elimination of such a step is a considerable advantage from a commercial point of view.

The molding materials may be molded, i.e., "pressed", by many of the techniques known in the art. Hot pressing, warm pressing, or cold pressing may be utilized. Hot pressing is described, for example, in a Bakelite® publication, *Rutaphen®-Resins for Grinding Wheels—Technical Information.* (KN 50E -09.92 - G&S-BA), and in Another Bakelite® publication: *Rutaphen® Phenolic Resins— Guide/Product Ranges/Application* (KN107/c -10.89 GS-BG), both of which are incorporated herein by reference. Useful information can also be found in Thermosetting Plastics, edited by J. F. Monk, Chapter 3 ("Compression Moulding of Thermosets"), 1981 George Goodwin Ltd. in association with The Plastics and Rubber Institute. This publication is also incorporated herein by reference. To illustrate, an abrasive disc or grinding wheel can be prepared by placing the blended material in an appropriate mold, usually made of stainless-, high carbon-, or high chrome-steel. Shaped plungers may be employed to cap off the mixture. Cold preliminary pressing is sometimes used, followed by preheating after the loaded mold assembly has been placed in an appropriate furnace. The mold assembly can be heated by any convenient method: electricity, steam, pressurized hot water, or gas flame. A resistance- or induction-type heater is usually employed. An inert gas like nitrogen may be introduced to minimize oxidation of the mold.

The specific temperature, pressure and time ranges will depend on the specific materials employed, the type of equipment in use, and the dimensions of the wheel. The molding pressure usually ranges from about 0.5 tsi to about 5.0 tsi, and preferably, from about 0.5 tsi to about 2.0 tsi. The pressing temperature for this process is typically in the range of about 115° C. to about 200° C.; and preferably, from about 140° C. to about 170° C. The holding time within the mold is usually about 30 to about 60 seconds per millimeter of abrasive article thickness.

For the purpose of this disclosure, the scope of the term "hot pressing" includes hot coining procedures, which are known in the art. In a typical hot coining procedure, pressure is applied to the mold assembly after it is taken out of the heating furnace.

Cold pressing and warm pressing are the preferred techniques for this invention, especially in embodiments where energy- and time-conservation requirements are critical. Cold pressing is described in U.S. Pat. No. 3,619,151, which is incorporated herein by reference. A predetermined, weighed charge of the blended composition is initially delivered to and evenly distributed within the cavity of a suitable mold, e.g., a conventional grinding wheel mold. The material remains at ambient temperature, usually less than about 30° C. Pressure is then applied to the uncured mass of material by suitable means, such as a hydraulic press. The pressure applied will be in the range of about 0.5 tsi to about 15 tsi, and more preferably, in the range of about 1 tsi to about 6 tsi. The holding time within the press will usually be in the range of about 5 seconds to about 1 minute. It appears that the compacting pressure necessary for favorable results can be reduced up to about 20% by the use of lubricant-type materials such as graphite and stearates.

Warm pressing is a technique very similar to cold pressing, except that the temperature of the blended mix in the mold is elevated, usually to some degree below about 140° C., and more often, below about 100° C. The same general pressure and holding time parameters followed for cold pressing are followed here.

After either cold or warm pressing, the molded material is usually cured. Selection of a curing temperature depends on at least several factors, including the strength, hardness, and grinding performance desired for the particular abrasive article. Usually, the curing temperature will be in the range of about 150° C. to about 250° C. In more preferred embodiments, the curing temperature will be in the range of about 150° C. to about 200° C. Curing time will range from about 6 hours to about 48 hours. In many instances, the final curing temperature is reached in steps, i.e., passing through intermediate temperatures and holding periods. Such a technique enhances additional wetting of the dry components in the mixture with the liquid components. Those of ordinary skill in the abrasive arts will be able to select an appropriate cure schedule without undue effort.

After pressing and curing (in the case of cold or warm pressing) is completed, the abrasive articles are usually stripped from the mold and air-cooled. Subsequent steps are also possible, e.g., the edging and finishing of abrasive wheels, according to standard practice. For this invention, the porosity of the molded article after curing is usually in the range of about 0% to about 50%, and most often, in the range of about 4% to about 30%.

The following examples further illustrate various aspects of embodiment A of this invention. They are not intended to limit it in any way, however. All parts and percentages are by weight, unless otherwise indicated.

EXAMPLE 1

4095 g of aluminum oxide abrasive of grit sizes 20 and 24 (1:1 ratio) and 4749 g of zirconia-alumina abrasive of grit sizes 14 and 16 (1:1 ratio) were preheated to 125° C. and placed in a mixing bowl of 51 cm diameter. 817 g of the low-molecular weight phenol-novolac resin, heated to 125° C., were slowly added to the mixer simultaneously with 4644 g of preblended, dry material (material at room temperature) consisting of 1485 g phenol-novolac resin, 1639 g iron pyrite, 922 g potassium sulfate, 454 g calcium oxide, and 145 g hexamethylenetetramine. During the mixing cycle, the bowl was rotating clockwise at 30 rpm. One set of agitator blades was rotating clockwise at 70 rpm, and another rake-like agitator was rotating counterclockwise at 110 rpm. Following a total mixing time of 6 minutes, the mixture temperature was at 75° C. The mixture at this point consisted of dry, flowable (resin/filler-coated abrasive) granules with less than 1% loose material.

EXAMPLE 2

The granular material of Example 1 was tested for bulk density using the ANSI procedure for Bulk Density of Abrasive Grains. In this method, the bulk density is determined by the weight of material required to fill a cylinder of known volume when the material is allowed to flow through a funnel and fall from a fixed height. The bulk density was determined to be 1.735 g/cm$^3$.

It is also possible to determine the flowability of a material by recording the time required for a precise weight (or volume) of material to fill the cylinder. The flowability of the material of Example 1 was determined to be 38.7 cm³/minute.

This flowability is in direct contrast to the flowability of "conventional" abrasive mixtures which could not be determined by the above technique, due to inability to flow from the funnel into the cylinder: a result of either excessive tackiness or excess loose material, preventing free flow.

In embodiment B of this invention, the same materials employed in embodiment A are used here, i.e., the abrasive, the phenol-novolacs for components (i) and (ii), the curing agent, and the optional fillers and other ingredients. The abrasive material may be blended with the two phenol-novolac resins by the continuous technique described for embodiment A. Alternatively, blending can be carried out by a discontinuous technique, also described above, which usually involves batch mixing, i.e., blending a portion of the phenol-novolac of component (i) with a portion of the phenol novolac of component (ii), followed by an additional portion of (i) and an additional portion of (ii), and so forth. Two to four cycles of component (i) and component (ii) additions are typically undertaken. As in embodiment A, the curing agent of component (iii) can be delivered to the mixer at any appropriate time, before or during addition of the other ingredients, but is preferably preblended with component (ii).

Blending times and temperatures after all of the resin components have been added are generally in the same range as for embodiment A. The same type of equipment may be used also. As in embodiment A, this embodiment does not require blending at high temperatures, e.g., 140° C., followed by a cooling step to take the blend to a much lower temperature, e.g., 90° C. After blending is complete, the resulting product is a dry, flowable granular material which is substantially dust-free, as in embodiment A. The abrasive grains are homogeneously coated with the phenol novolac resins. They are also storage-stable, and do not have to be aged before being molded.

In embodiment B, the blended material is molded or "pressed" as in the first embodiment, but molding temperatures must be maintained below about 140° C., and preferably, below about 100° C. Even lower warm-pressing temperatures, e.g., below about 80° C., are sometimes desirable. In especially preferred embodiments, cold pressing is employed, i.e., the pressing temperature is less than about 30° C. The other pressing parameters described above are applicable for this embodiment as well.

The molded materials are usually cured as in embodiment A. Those of ordinary skill in the art will be able to select an appropriate cure schedule without undue effort. The cured articles (for example, grinding wheels) can then be subjected to finishing steps as described previously.

The following, non-limiting examples further illustrate various aspects of embodiment B. All parts and percentages are by weight, unless otherwise indicated.

EXAMPLE 3

Sample A, based on this invention, was prepared by preheating 11,080.0 g of an abrasive blend of alumina and zirconia alumina (24 to 46 grit) to a temperature in the range of about 80° C. to about 120° C. The blend was then placed in a mixing bowl of 51 cm diameter, similar to that used for example 1. 845.5 g of a low molecular weight phenol-novolac resin (phenol-formaldehyde molar ratio of 1:0.2 to 1:0.35 was used as component (i). This material was preheated to a temperature sufficient to attain a viscosity of about 400 cp to 800 cp (i.e., a temperature in the range of about 115° C.–125° C.). Component (ii) consisted of 2592.3 g of a pre-blended dry bonding material containing 963.3 g standard phenol novolac material, 848.0 g iron pyrite, 474.9 g potassium sulfate, 219.6 g calcium oxide, and 86.6 g hexamethylenetetramine. The component (i) and (ii) materials were layered onto the abrasive grains in a series of three steps, with each step utilizing about one-third of the total amount of each component. Mixing parameters were similar to those used for example 1, with a mixing temperature of about 120° C.

The resulting dry, flowable product contained only 0.5% of loose bond material (i.e., dry resin and fillers that were not adhering to the abrasive grain). The product was cold-pressed (pressing temperature of about 25° C.) into portable wheels having a diameter of 7 inches and a thickness of 0.285 inch. The wheels were then cured in a standard box oven at 175° C.–185° C. for 20 hours.

After curing, the wheel porosity for Sample A was 16% by volume, abrasive content was 48% by volume, and resin content was 36% by volume.

Sample B was a standard process sample used as a comparison. Sample B had the same volume structure as sample A, and utilized the same abrasive, standard phenol novolac resin, and fillers. Sample B did not contain any of the low molecular weight phenol-novolac resin used as component (i) of the present invention. Instead, this sample contained small amounts (about 1.5% of the entire mix weight) of processing liquids, i.e., solvents, wetting agents, and dampening agents. Sample B also contained a liquid resole resin in an amount sufficient to equal the total volume of ingredients for Sample A.

Sample B was prepared by placing the abrasive material in a mix pan and pouring the liquid resole resin on top of it, followed by the addition of all of the dry mix components. The processing liquids were then added. The composition was then blended in its entirety, i.e., in a single step, at a temperature of about 25° C. Pressing and curing were then carried out in a manner substantially identical to that employed for Sample A.

After curing, the wheel porosity for Sample B was 16% by volume, abrasive content was 48% by volume, and resin content was 36% by volume.

Various tests were performed on segments of wheels based on the present invention and based on the comparative, standard process sample. The results, based on an average of about 10 segments for each wheel, were as follows:

|  | Sample A | Sample B* |
| --- | --- | --- |
| Heat Distortion Temperature: | 280° C. | 290° C. |
| Density: | 2.57 g/cm³ | 2.55 g/cm³ |
| MOR Strength** | 6400 psi | 6100 psi |
| Thermal Expansion (250° C.) | 0.3% | 0.25% |
| Wheel Burst Test*** | 31,000 sfpm | 31,000 sfpm |

*Comparative sample
**Modulus of Rupture
***Wheel mounted on hub, spun until force causes it to shatter or "burst"; speed in surface feet per minute recorded.

The data demonstrate that the properties of wheel samples prepared according to this embodiment of the present invention are generally equivalent to those prepared by processes of the prior art.

The wheels were also tested for grinding properties as compared to wheels made by the standard process. In regard to grinding ratio (i.e., the amount of a metal workpiece removed per amount of wheel wear), an average value of 20 to 25 lb/lb was obtained, which was essentially equal to or greater (up to 10% higher) than that obtained for the standard process samples.

For Sample A, the same process was carried out, utilizing Eirich and Littleford high intensity mixers. Although the resulting wheel properties were similar to those obtained by the use of the bowl mixer, the bowl mixer is preferred because of its lower power operation.

EXAMPLE 4

The process set forth in example 3 was followed here to prepare cutting-off wheels, i.e., layering components (i) and (ii) onto the abrasive grains in a series of three steps. A bowl-type mixer similar to that used in example 1 was employed here. The composition of Sample C, based on this invention, was as follows:

Abrasive: 4698.1 g alumina and 5614.2 g zirconia alumina, each 24 grit: The volume of abrasive in the final product was 50%.

Standard Phenol-Novolac Resin (i.e., component (ii): 832.2 g

Low Molecular Weight Phenol-Novolac (i.e., component (i)): 731.4 g (Each phenol-novolac resin constituted approximately 50% of the total volume of resin).

Other components: 1,029.7 g iron pyrite; 577.5 g potassium sulfate; 74.9 g hexamethylenetetramine
The total volume for resins and fillers was 36%.

Blending was carried out as in example 3, Sample A. After blending was complete, the dry, flowable granules were determined to contain 0.3% by volume of loose material. The product was then warm-pressed at a temperature of about 75° C. and a pressure of about 2–3 tsi, and then cured in a standard box oven at 175° C. for 8 hours. Wheel porosity was 14% by volume.

A comparative sample, Sample D, had the same composition as sample B in example 3, and was prepared in the same manner. Sample D had the same volume structure (i.e., abrasive, resin, and pore percentages) as sample B in example 3.

The material of Sample D was generally tacky and sticky after the blending step, in contrast to the dry, flowable material of Sample C. While in some instances, tackiness may be desirable because it increases green strength, such a characteristic is often undesirable because it decreases material flow and processing. Furthermore, the tackiness is an indication of the presence of residual solvents, which sometimes cause odor and environmental problems.

Test bars were cut from each finished wheel, and various tests were performed on the bars. The results, on average (about 10 test bars), were as follows:

|  | Sample C | Sample D* |
|---|---|---|
| Heat Distortion Temperature: | 222° C. | 225° C. |
| Density: | 2.60 g/cm³ | 2.61 g/cm³ |
| MOR Strength** | 5700 psi | 6200 psi |
| Thermal Expansion (250° C.) | 0.4% | 0.35% |

*Comparative sample
**Modulus of Rupture

These results indicate that materials made by the process of embodiment B have properties which are substantially similar to those prepared by a standard process of the prior art. The modulus of rupture value is decreased somewhat for sample C, but is still very adequate for most end uses.

Furthermore, the properties for sample C have been obtained at pressing temperatures which are desirably lower than the hot pressing temperatures used in the prior art, without the need for a mix-aging step before pressing.

Other modifications and variations of this invention are possible in view of the description thus provided. It should be understood, therefore, that changes may be made in the particular embodiments shown which are within the scope of the invention defined in the appended claims.

All of the patents and articles mentioned above are incorporated herein by reference,

We claim:

1. An improved method for preparing a molding material for abrasive articles, comprising the step of continuously blending an abrasive material with measured portions of
   (i) a low-molecular weight phenol-novolac resin having a phenol-formaldehyde molar ratio in the range of about 1:0.2 to about 1:0.35, heated to a temperature sufficient to yield a viscosity in the range of about 300 cp to about 3000 cp;
   (ii) a composition comprising a second phenol-novolac resin; and
   (iii) a curing agent;
   at a blending temperature in the range of about 80° C. to about 130° C.;
   such that the resulting molding material is a flowable, granular material homogeneously coated with the phenol-novolac resins.

2. The method of claim 1, wherein the blending temperature is in the range of about 90° C. to about 125° C.

3. The method of claim 1, wherein the abrasive material is heated to a temperature in the range of about 30° C. to about 150° C., prior to mixing with components (i) and (ii).

4. The method of claim 1, wherein the abrasive material is selected from the group consisting of conventional abrasives, superabrasives, and mixtures thereof.

5. The method of claim 4, wherein the abrasive material is selected from the group consisting of aluminum oxide, sol gel alumina, zirconia-alumina, silicon carbide, diamond, cubic boron nitride, and mixtures thereof.

6. The method of claim 4, wherein the abrasive material has an average particle size in the range of about 0.5 micrometer to about 5000 micrometers.

7. The method of claim 4, wherein the curing agent is preblended with component (ii).

8. The method of claim 4, wherein component (ii) includes at least one filler.

9. The method of claim 1, wherein the total amount of components (i) and (ii) which does not adhere to the abrasive material after the mixing step is less than about 3%, based on the total weight of the molding material.

10. The method of claim 1, wherein the resulting molding material is subsequently warm-pressed, without first being aged, at a pressing temperature less than about 140° C.

11. The method of claim 10, wherein the molded material is cured at a temperature in the range of about 150° C. to about 250° C.

12. The method of claim 1, wherein the resulting molding material is subsequently cold-pressed, without first being aged, at a pressing temperature less than about 30° C.

13. The method of claim 12, wherein the molding pressure during pressing is in the range of about 0.5 tsi to about 15 tsi.

14. The method of claim 12, wherein the molded material is cured at a temperature in the range of about 150° C. to about 250° C.

15. The method of claim 1, wherein the resulting molding material is subsequently hot-pressed, without first being aged, at a pressing temperature of about 140° C. to about 170° C.

16. The method of claim 15, wherein the molding pressure during pressing is in the range of about 0.5 tsi to about 5.0 tsi.

17. An improved method for preparing an abrasive grinding tool, comprising the steps of:
(a) continuously blending an abrasive material with measured portions of
  (i) a low-molecular weight phenol-novolac resin having a phenol-formaldehyde molar ratio in the range of about 1:0.2 to about 1:0.35, heated to a temperature sufficient to yield a viscosity in the range of about 300 cp to about 3000 cp;
  (ii) a composition comprising a second phenol-novolac resin; and
  (iii) a curing agent,
at a blending temperature in the range of about 80° C. to about 130° C.;
such that the resulting product is a flowable, granular material homogeneously coated with the phenol-novolac resins; and then
(b) molding and curing the resulting product, without aging.

18. The method of claim 17, wherein molding is carried out by cold pressing or warm pressing.

19. A method for preparing an abrasive article, comprising
(a) blending an abrasive material with
  (i) a low-molecular weight phenol-novolac resin having a phenol-formaldehyde molar ratio in the range of about 1:0.2 to about 1:0.35, heated to a temperature sufficient to yield a viscosity in the range of about 300 cp to about 3000 cp;
  (ii) a composition comprising a second phenol-novolac resin; and
  (iii) a curing agent;
at a temperature in the range of about 90° C. to about 125° C. to produce an abrasive mixture;
(b) molding the abrasive mixture by pressing at a pressing temperature less than about 140° C.; and
(c) curing the molded abrasive mixture.

20. The method of claim 19, wherein the abrasive material is heated to a temperature in the range of about 30° C. to about 150° C., prior to mixing with components (i) and (ii).

21. The method of claim 19, wherein the abrasive material is selected from the group consisting of conventional abrasives, superabrasives, and mixtures thereof.

22. The method of claim 21, wherein the abrasive material is selected from the group consisting of aluminum oxide, sol gel alumina, zirconia-alumina, silicon carbide, diamond, cubic boron nitride, and mixtures thereof.

23. The method of claim 21, wherein the curing agent is preblended with component (ii).

24. The method of claim 21, wherein component (ii) includes at least one filler.

25. The method of claim 19, wherein the total amount of components (i) and (ii) which does not adhere to the abrasive material after the mixing step is less than about 3%, based on the total weight of the molding material.

26. The method of claim 19, wherein components (i) and (ii) are blended with the abrasive material in at least two addition steps which are discontinuous steps.

27. The method of claim 19, wherein components (i) and (ii) are continuously blended with the abrasive material.

28. The method of claim 19, wherein the pressing is warm pressing carried out at a temperature less than about 100° C.

29. The method of claim 28, wherein warm pressing is carried out at a temperature less than about 80° C.

30. The method of claim 28, wherein the molded abrasive mixture is cured at a temperature in the range of about 150° C. to about 250° C.

31. The method of claim 19, wherein the pressing is cold pressing carried out at a temperature less than about 30° C., without first aging the molded abrasive mixture.

32. The method of claim 31, wherein the molding pressure during pressing is in the range of about 0.5 tsi to about 15 tsi.

33. The method of claim 31, wherein the molded abrasive mixture is cured at a temperature in the range of about 150° C. to about 250° C.

* * * * *